US009182234B2

(12) United States Patent
Ninomiya et al.

(10) Patent No.: US 9,182,234 B2
(45) Date of Patent: Nov. 10, 2015

(54) FISHFINDER DATA DISPLAY DEVICE, FISHFINDER DEVICE, METHOD OF SPECIFYING DESTINATION AND COMPUTER READABLE MEDIA

(71) Applicant: FURUNO Electric Company, Limited, Nishinomiya, Hyogo (JP)

(72) Inventors: Akira Ninomiya, Nishinomiya (JP); Shuji Wada, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 67 days.

(21) Appl. No.: 13/631,253

(22) Filed: Sep. 28, 2012

(65) Prior Publication Data
US 2013/0085630 A1 Apr. 4, 2013

(30) Foreign Application Priority Data
Sep. 30, 2011 (JP) .................. 2011-218617

(51) Int. Cl.
| | |
|---|---|
| *G01C 21/00* | (2006.01) |
| *G01S 15/96* | (2006.01) |
| *G05D 1/02* | (2006.01) |
| *G01S 7/62* | (2006.01) |

(52) U.S. Cl.
CPC .............. *G01C 21/005* (2013.01); *G01S 7/629* (2013.01); *G01S 7/6272* (2013.01); *G01S 7/6281* (2013.01); *G01S 15/96* (2013.01); *G05D 1/0206* (2013.01)

(58) Field of Classification Search
CPC ..... G01S 15/96; G01S 7/6272; G01S 7/6281; G01S 7/629; G01C 21/005; G05D 1/0206

USPC ................... 701/21, 418, 438, 467
See application file for complete search history.

(56) References Cited

U.S. PATENT DOCUMENTS

| 6,009,373 A | 12/1999 | Shimojima et al. |
|---|---|---|
| 2004/0003958 A1* | 1/2004 | Fujimoto et al. ............. 181/124 |
| 2007/0162207 A1 | 7/2007 | Shimo et al. |
| 2011/0213515 A1* | 9/2011 | Haymart et al. ................ 701/21 |

FOREIGN PATENT DOCUMENTS

| JP | 63-300983 A | 12/1988 |
|---|---|---|
| JP | 03-218488 A | 9/1991 |

(Continued)

OTHER PUBLICATIONS

Raymarine, Raymarine Product Brochure 2010, 2010.*
(Continued)

*Primary Examiner* — John Q Nguyen
*Assistant Examiner* — Nadeem Odeh
(74) *Attorney, Agent, or Firm* — Global IP Counselors, LLP (57) ABSTRACT

A fishfinder data display device is provided. The display device includes a memory for storing fishfinder data obtained by a fishfinder detecting underwater and a location where the fishfinder data is acquired so as to associate the fishfinder data with the location, a display unit for displaying an image created based on the fishfinder data, and a controller, when an operator performs a specifying operation to a predetermined part of the image displayed by the display unit, for reading the location corresponding to the fishfinder data based on the specified predetermined part of the image from the memory, and causing an autopilot device to execute an autopilot operation with the location as a destination.

14 Claims, 7 Drawing Sheets

(56) References Cited

FOREIGN PATENT DOCUMENTS

| | | |
|---|---|---|
| JP | 08-338739 A | 12/1996 |
| JP | 2000-344193 A | 12/2000 |
| JP | 2002-090171 A | 3/2002 |
| JP | 4261330 B2 | 4/2009 |

OTHER PUBLICATIONS

McEwen, Boater's Pocket Reference: Your Comprehensive Resource for Boats and Boating, 2006, Chapter 5, pp. 277-296.*

Office Action of the corresponding Japanese Patent Application No. 2011-218617, dated Apr. 21, 2015.

* cited by examiner

FIG. 7

FISHFINDER DATA DISPLAY DEVICE, FISHFINDER DEVICE, METHOD OF SPECIFYING DESTINATION AND COMPUTER READABLE MEDIA

CROSS-REFERENCE TO RELATED APPLICATION(S)

The application claims priority under 35 U.S.C. §119 to Japanese Patent Application No. 2011-218617, which was filed on Sep. 30, 2011, the entire disclosure of which is hereby incorporated by reference.

TECHNICAL FIELD

The present invention relates to a fishfinder data display device for displaying fishfinder data obtained by detecting underwater. The present invention also relates to a fishfinder device including the display device, a method of specifying a destination, and computer readable media.

BACKGROUND OF THE INVENTION

Conventionally, fishfinders which perform underwater detections have been known. A common fishfinder discharges an ultrasonic wave underwater (normally, directly below) and receives a reflection wave corresponding to the ultrasonic wave. The fishfinder then analyzes the reflection wave to create data indicative of existence of a school of fish, a water depth, an underwater state, and the like (fishfinder data). The fishfinder data acquired by the fishfinder is normally displayed with a vertical axis of the depth and a horizontal axis of time.

Further, conventionally, autopilot devices which automatically guide a ship toward a preset destination have been known. Such an autopilot device, for example, detects a difference between a direction of a destination from the ship and a heading of the ship, and controls a rudder to correct the heading. Regarding such an autopilot device, a configuration in which a ship can keep circling centering on a desired location has also been known as disclosed in JP4261330B2.

When having the device guide the ship toward a location where a school of fish was detected in the past, with reference to fishfinder data acquired in the past, an operator needs to perform the following operations. Specifically, the operator first refers to a horizontal axis (time axis) of a screen image where the fishfinder data is displayed to find out a time point at which the school of fish was detected. Then, the operator operates the device to display a trace of the ship on a display unit, and estimates the location of the school of fish based on the trace and the time. The operator then instructs the device with this location as a destination of the ship. Thus, the ship can again reach the location where the school of fish was detected in the past.

However, these operations are troublesome for the operator because more than two operations are required. In addition, since in such a device the operator has to estimate the school of fish location based on the time and trace, an exact location of the school of fish, which may have been moving around, could not be identified. Therefore, an improvement has been longed for the device.

SUMMARY OF THE INVENTION

The present invention is made in view of the above situation, and it provides a fishfinder data display device that can display fishfinder data, and allow an operator to instruct, with a simple operation, an autopilot operation reach a destination indicated by fishfinder data acquired in the past.

According to one aspect of the invention, a fishfinder data display device is provided. The display device includes a memory configured to store fishfinder data obtained by a fishfinder detecting underwater and to store a location where the fishfinder data is acquired so as to associate the fishfinder data with the location, a display unit of displaying an image created based on the fishfinder data, and a controller, when an operator performs a specifying operation to a predetermined part of the image displayed by the display unit, for reading the location corresponding to the fishfinder data based on the specified predetermined part of the image from the memory, and causing an autopilot device to execute an autopilot operation with the location as a destination.

Thus, when the operator finds a place to go referring to the past fishfinder data, the operator is only required to perform a simple operation (e.g., a touch operation or a click operation to the display screen) to direct a ship to the desired location.

According to another aspect of the invention, a fishfinder device is provided. The fishfinder device includes the fishfinder data display device described above, and an oscillator for transmitting a sound wave underwater and receiving a corresponding reflection wave to acquire the fishfinder data.

Thus, similar effects of the fishfinder data display device can be demonstrated also in the fishfinder device.

In addition, the present invention may also be implemented as a method and a computer readable media containing a computer program implementing the method.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
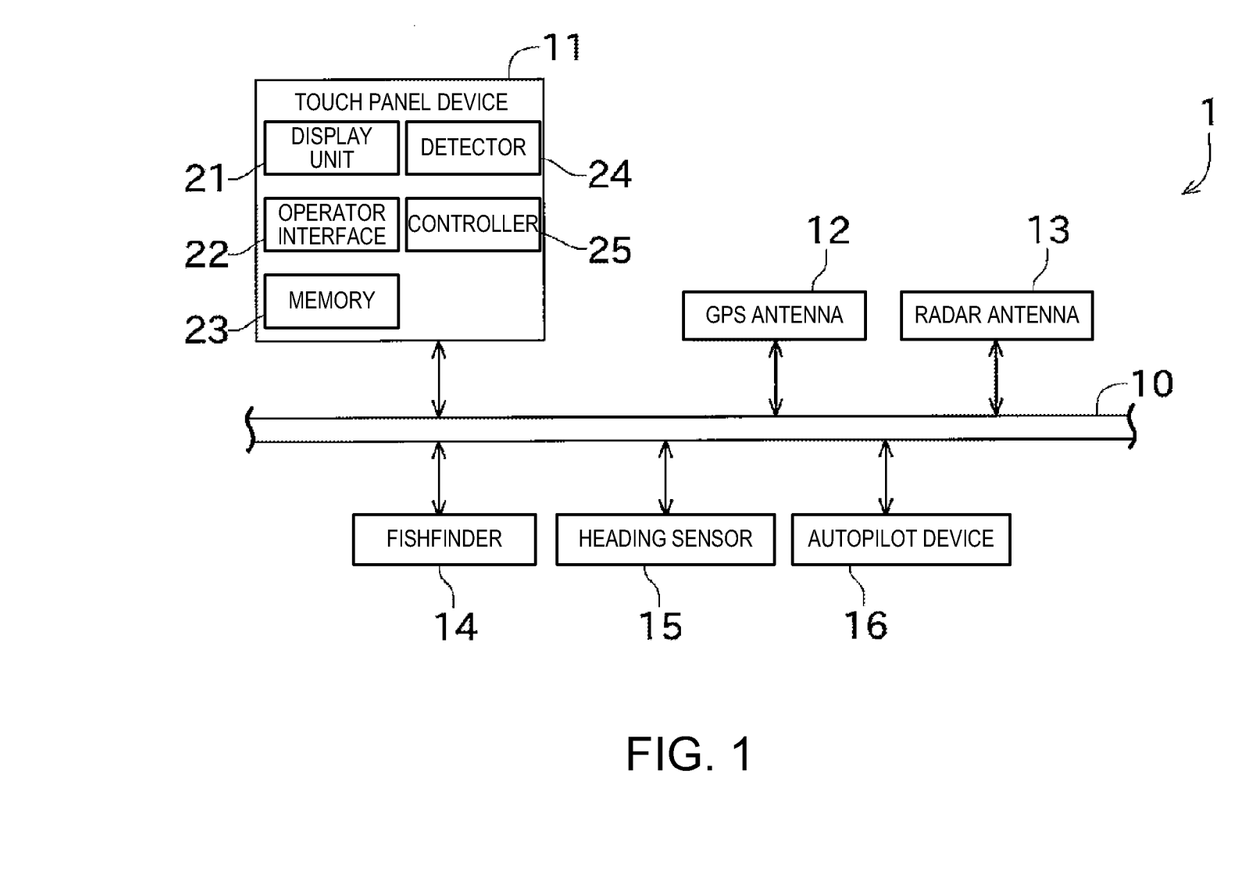
FIG. 1 is a block diagram showing the entire configuration of a ship instrument network system.
Figure 2:
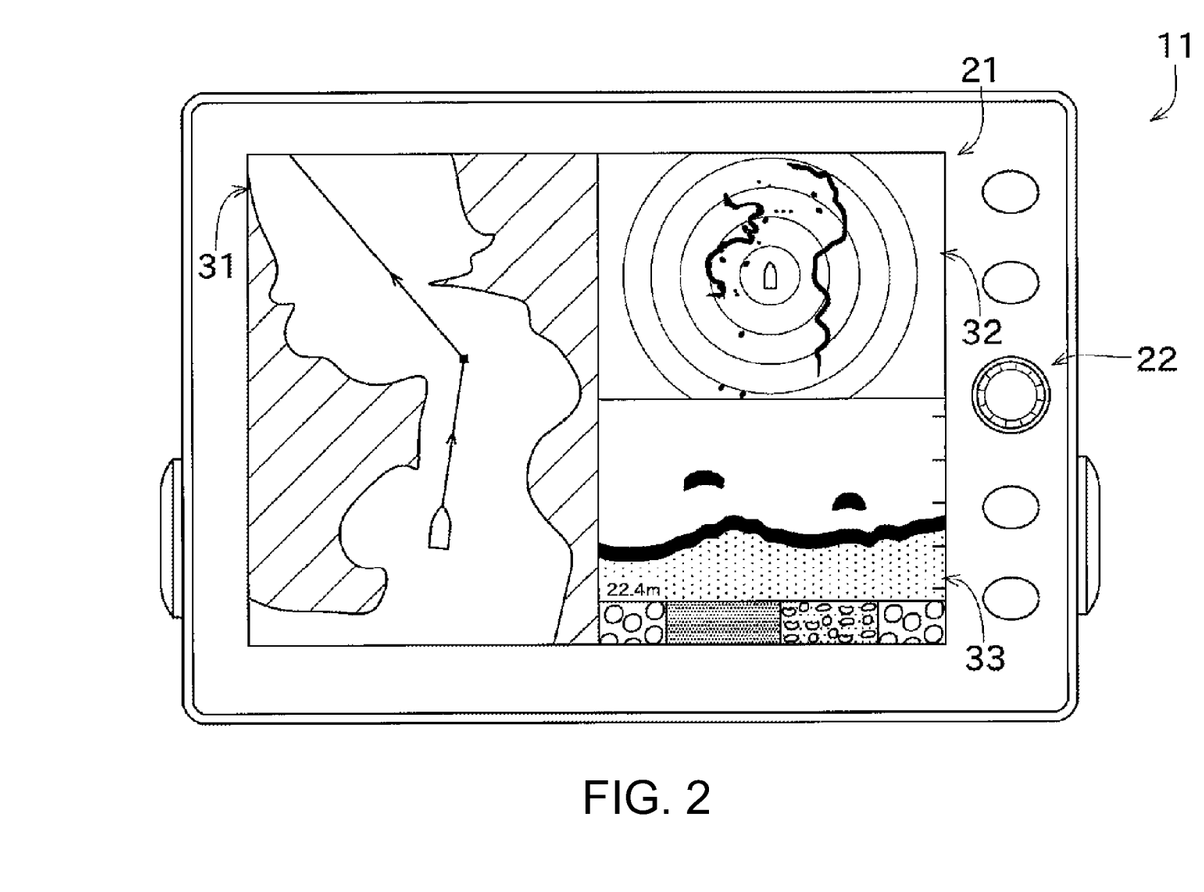
FIG. 2 is an elevational view of a touch panel device shown in FIG. 1.

Hereinafter, one embodiment of the invention is described with reference to the accompanying drawings. FIG. 1 is a block diagram showing the entire configuration of a ship instrument network system 1. FIG. 2 is an elevational view of a touch panel device 11 shown in FIG. 1.

The ship instrument network system 1 includes a plurality of ship instrument connected to a ship network 10. The ship instrument can exchange detected information through the ship network 10. The ship network 10 may be based on the standard including LAN (Local Area Network), CAN (Controller Area Network), etc.

As shown in FIG. 1, the ship instrument network system 1 includes, as the ship instrument, a touch panel device 11

(information display device), a GPS antenna 12 (GNSS sensor), a radar antenna 13, a fishfinder 14 (acoustic sensor), a heading sensor 15, and an autopilot device 16.

The touch panel device 11 creates and displays an image based on information detected by other ship instrument or sensors (sensor image), and detects one or more touch operations to a screen image, to execute processing according to the detection results. Specifically, the touch panel device 11 includes a display unit 21, an operator interface 22, a memory 23, a detector 24, and a controller 25.

The display unit 21 is comprised of, for example, a liquid crystal display, and as described above, it can display on the screen image, the sensor image, various setting screen images, etc.

The operator interface 22 includes a rotary key which can be rotated in clockwise and counterclockwise directions, and a menu key for calling a menu screen image. Note that, since the touch panel device 11 allows the operator to input and instruct by one or more suitable touch operations to the display screen, the number of keys of the operator interface 22 can be reduced.

The memory 23 stores one or more computer programs to be executed by the controller 25, nautical chart information, one or more navigation routes set for individual operators, etc.

The detector 24 detects one ore more touch operations to the display screen by the operator. In this embodiment, a projected capacitive type touch panel is used in order to detect the touch operation(s). This type of touch panel has a plurality of electrodes with high transparency arranged on the display panel to detect a touch location based on a change in the capacitance of each electrode caused when a fingertip approaches the panel. This type of touch panel is also detectable of a movement of the touching finger (a change in the touch location), in addition to the touch location. Further, when a plurality of locations are simultaneously touched on the touch panel, the detector 24 can also detect the touch locations and a change in each touch location. The touch location(s) and the change(s) in the touch location(s) detected by the detector 24 are outputted to the controller 25. The detection type of the touch operation is not limited to the projected capacitive type as described above, but any other suitable type of touch panel technologies may also be used. Note that a stylus (or a stylus pen) or other pen type tool may also be used instead of the human finger.

The controller 25 creates a sensor image (e.g., a radar image, a nautical chart around the ship, etc.) based on the data stored in the memory 23 and the information received from other ship instrument, and then displays the sensor image on the display unit 21. The controller 25 receives the information from a plurality of ship instrument and, thus, creates a plurality of sensor images. The controller 25 can switch between a full-screen mode in which only one of the plurality of sensor images is selectively displayed on the display screen, and a split-screen mode (see FIG. 2) in which two or more sensor images are displayed simultaneously in respective divided areas of the display screen.

The controller 25 identifies which kind of touch gesture the operator has performed by matching a change of the touch location detected by the detector 24 with preset types of touch operation (touch gestures). The controller 25 then executes processing associated with the identified touch gesture.

The touch gesture includes a "drag operation," which is a kind of touch gesture where a touched finger (normally one finger) in moved in a predetermined direction without separating from the display screen. The drag operation is normally associated with a scrolling of the display image. Note that the drag operation also includes a flick operation where a finger is quickly moved while the finger is kept on the display screen. The touch gesture also includes a "pinch operation," which is an operation where two touched fingers are brought close to each other (pinch-in) or separated from each other (pinch-out), without lifting the fingers from the display screen. The pinch operation is normally associated with processing to change the scale of the display image. Note that the controller 25 can also be configured to identify any other touch gestures.

The GPS antenna 12 receives positioning signals from GPS Satellites (GNSS satellites), and outputs them to the touch panel device 11 via the ship network 10. The controller 25 calculates the location of the ship based on these positioning signals (in detail, the location of the GPS antenna or the absolute location based on the terrestrial frame). Note that the GPS antenna 12 may instead calculate the location based on the positioning signals and output the ship location to the touch panel device 11.

The touch panel device 11 can function as a navigation device based on the obtained ship location and the nautical chart information stored in the memory 23. Specifically, the controller 25 can display the ship location on the display unit 21 so as to be superimposed on the nautical chart. The controller 25 can also calculate a ground speed of the ship and/or draw a trace of the ship based on two or more time-series ship locations, and display them on the display unit 21. The controller 25 can create a navigation route and display it on the display unit 21 as the operator selects a destination and one or more waypoints (intermediate locations on the route) via the touch operation (see a first sensor image 31 shown in FIG. 2).

The radar antenna 13 transmits a microwave and receives a corresponding reflection wave from a target object. The reflection wave is outputted to the touch panel device 11 after suitable signal processing is performed. The touch panel device 11 creates the radar image based on this reflection wave. Specifically, the controller 25 calculates a distance of the target object based on a length of time after transmitting the microwave until the corresponding reflection wave is received. The controller 25 calculates a direction of the target object based on the transmitted direction of the microwave corresponding to the target object. The controller 25 thus creates the radar image and displays it on the display unit 21 (see a second sensor image 32 shown in FIG. 2).

The fishfinder 14 is comprised of an oscillator and an analyzer. The oscillator is typically installed on the bottom of the ship. The oscillator discharges the ultrasonic wave underwater directly below, and receives the reflection wave from a water bottom or a school of fish. The analyzer creates fishfinder data (data acquired by the fishfinder, data of the school of fish or water bottom, etc.) based on the reflection waves.

The fishfinder 14 has a function to determine an underwater state (e.g., a bottom sediment type) based on the acquired fishfinder data. Specifically, the analyzer can determine the possibilities of the water bottom falling under any of preset sediment types, including rocks, gravels (stones), sand, and mud, by analyzing the reflection wave. The fishfinder data and the bottom sediment type(s) are outputted to the touch panel device 11. Then, the controller 25 creates a third sensor image 33 (see FIG. 2) based on the received data, and displays it on the display unit 21. The third sensor image 33 has a vertical axis of the fishfinder data, and a horizontal axis of a time point at which the fishfinder data is acquired (the data is older as it goes to the left in the screen image).

The heading sensor 15 detects a heading of the ship as an absolute azimuth based on the terrestrial frame. Normally, the ship moves directly forward, toward the heading, without side current or wind. Therefore, the heading of the heading sensor 15 normally refers to the ship's traveling azimuth. The heading sensor 15 may be comprised of a magnetic azimuth sensor, a GPS compass, etc.

The autopilot device 16 is a device which automatically operates a rudder of the ship so that the ship travels along the preset navigation route. The autopilot device 16 calculates a required change in the heading based on the heading acquired from the heading sensor 15 and the navigation route acquired from the touch panel device 11. The autopilot device 16 then coincides the course of the ship with the navigation route by changing an angle of the rudder according to the calculated value.

Note that any kind of ship instrument may be adopted to constitute the ship instrument network system 1 and, thus, ship instrument other than those described above may be connected to the network system, or a plurality of same kind of ship instrument may be connected to the network system. The processing of the data acquired by the ship instrument may be performed in the ship instrument per se, or may be performed by the controller 25.

Next, operations performed by the operator and controls executed by the controller 25 when fishing is carried out using the fishfinder data acquired in the past are described. In this embodiment, the operator specifics a part indicating a school of fish in the third sensor image 33 (e.g., an echo or a symbol described later) to instruct the autopilot device 16 to execute the autopilot operation with the specified location of the school of fish as a destination.

First, in order to achieve this function, processing which is executed by the fishfinder 14 and the controller 25 when creating the third sensor image 33 is described. The fishfinder 14 obtains the ship location by receiving the positioning signals from the GPS antenna 12. The fishfinder 14 has a built-in clock and obtains time from the clock. The fishfinder 14 associates the fishfinder data with a time and a ship location when the fishfinder data is acquired. The fishfinder 14 transmits the fishfinder data and the associated time and ship location to the controller 25.

When the information including the fishfinder data and the associated time and ship location are received from the fishfinder 14, the controller 25 stores the information in the memory 23. The controller 25 then creates the third sensor image 33 based on the information, and displays it on the display unit 21.

Note that the processing of associating the fishfinder data with the time and ship location may instead be executed in the touch panel device 11.

Figure 3:
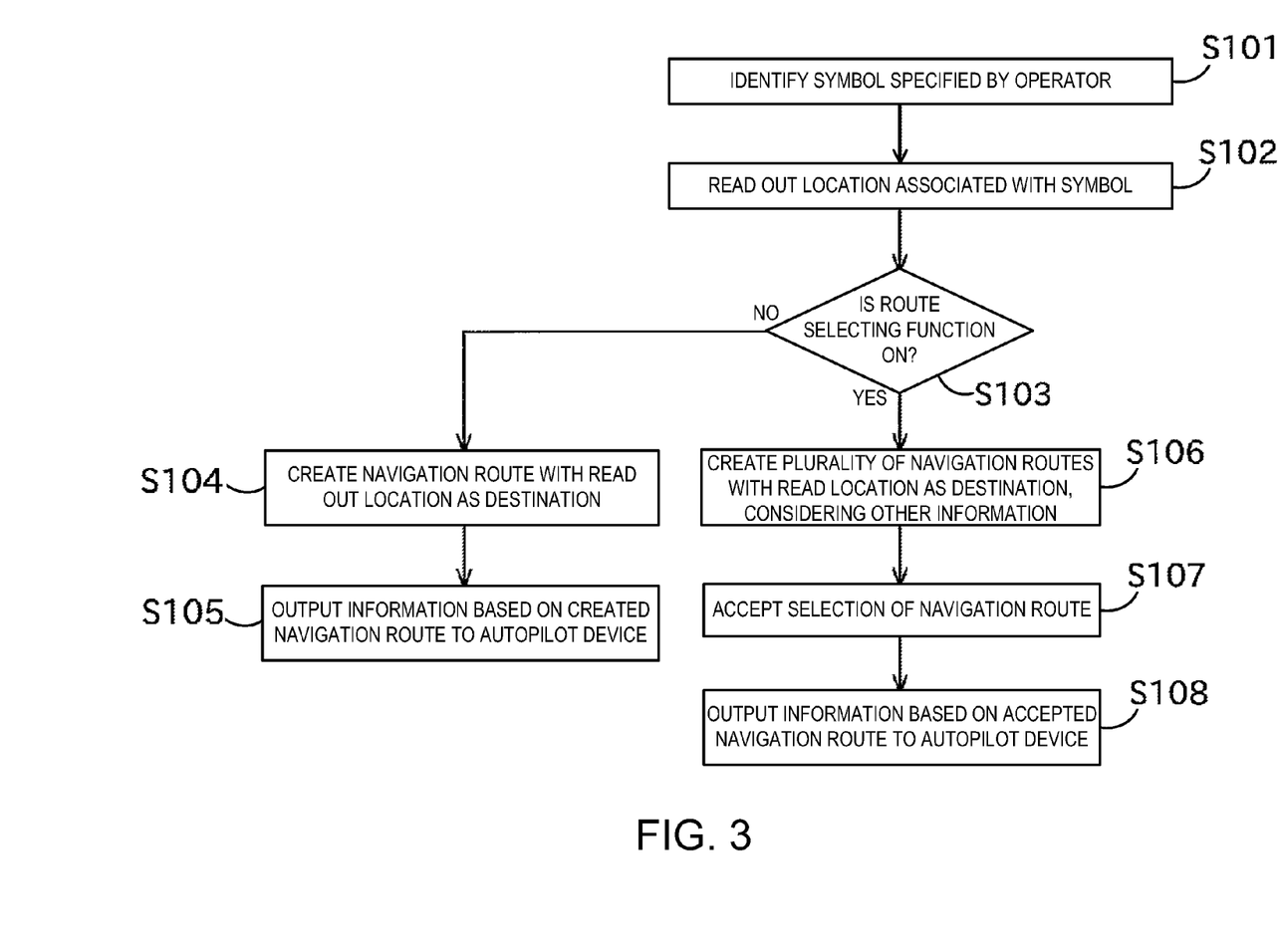
FIG. 3 is a flowchart showing processing executed by a controller when a symbol indicative of a school of fish is specified.
Figure 4:
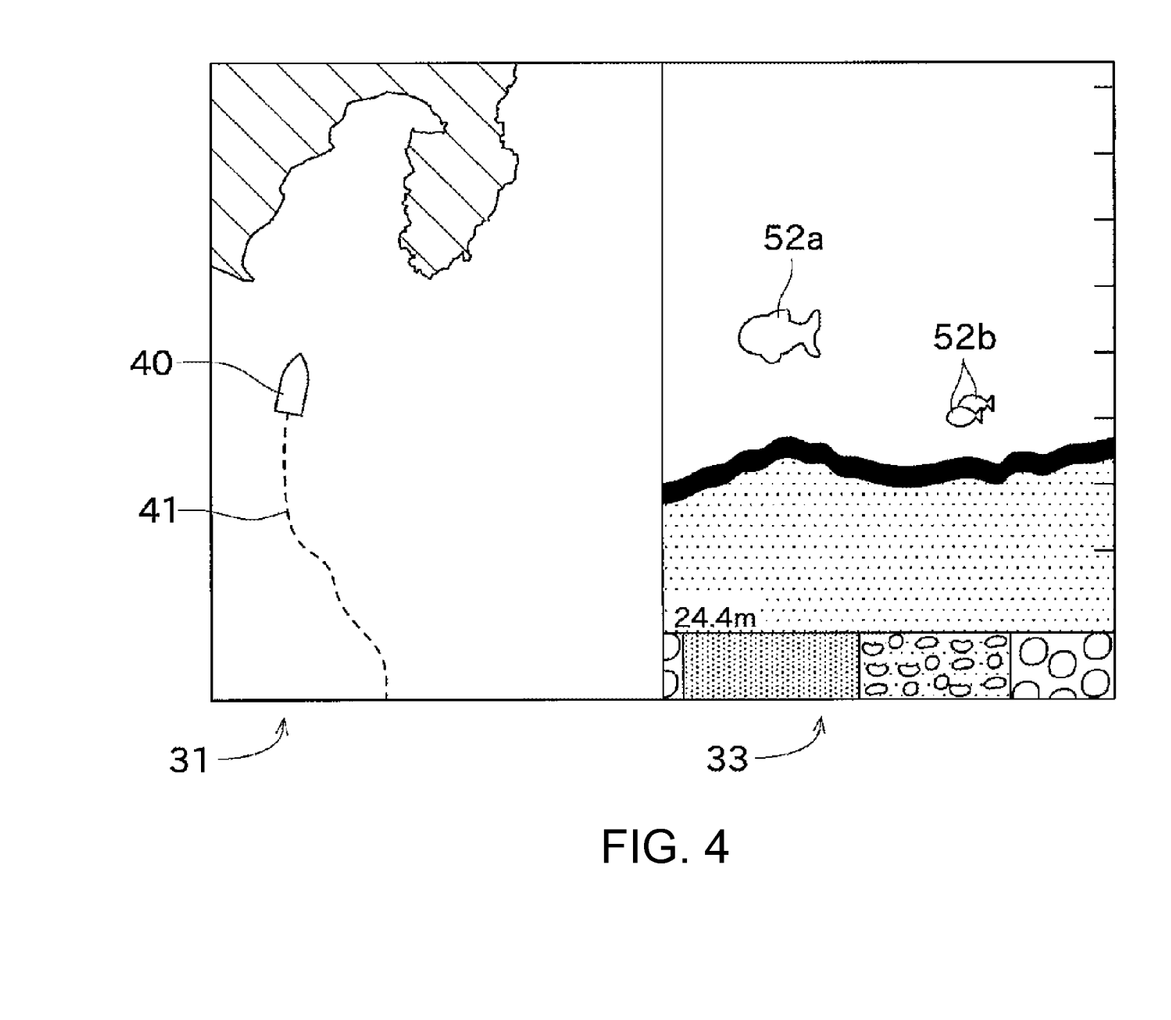
FIG. 4 is a view showing a screen image where a first sensor image and a third sensor image are displayed.

Next, processing executed by the controller 25 when the operator specifics the symbol indicative of a school of fish is described with reference to FIGS. 3 to 7. FIG. 3 is a flowchart showing processing executed by the controller 25 when the symbol indicative of a school of fish is specified. FIGS. 4 to 7 show views showing screen images of the display unit 21.

The operator refers to the third sensor image 33 to obtain, for example, information on the detected school of fish and the time when the school of fish was detected. The information on the school of fish includes a scale of the school, a fish length, and a fish kind which may be found out from the fish length. In order to display the detected school of fish, the touch panel device 11 displays the received echo signal as it is (see the third sensor image 33 in FIG. 2), or calculates a fish length based on the echo and displays a symbol corresponding to the fish length (or a fish kind) (see symbols 52a and 52b in FIG. 4).

When the operator refers to the third sensor image 33 and finds out a part where a desired school of fish is displayed, he/she performs an operation to specify the symbol (specifying operation). The specifying operation includes a long push, a tap (quick touch), and a double tap on the symbol. The touch operation may be performed after an operation mode is changed to a predetermined specifying mode.

The operator may also specify any other parts on the display screen for the specification purposes, such as an indication of the bottom sediment type which may be displayed in a lower part of the third sensor image 33, and an echo other than a school of fish (e.g., an echo indicative of the water bottom). In this embodiment, the case where the operator specifies the symbol 52a is described.

When the detector 24 detects the operator's specifying operation, it outputs the detection result to the controller 25. The controller 25 indentifies a symbol which is specified by the operator based on the detection result (S101). When the controller 25 identifies the symbol, it refers to the stored data of the memory 23 and reads out a location associated with the symbol (S102).

Figure 5:
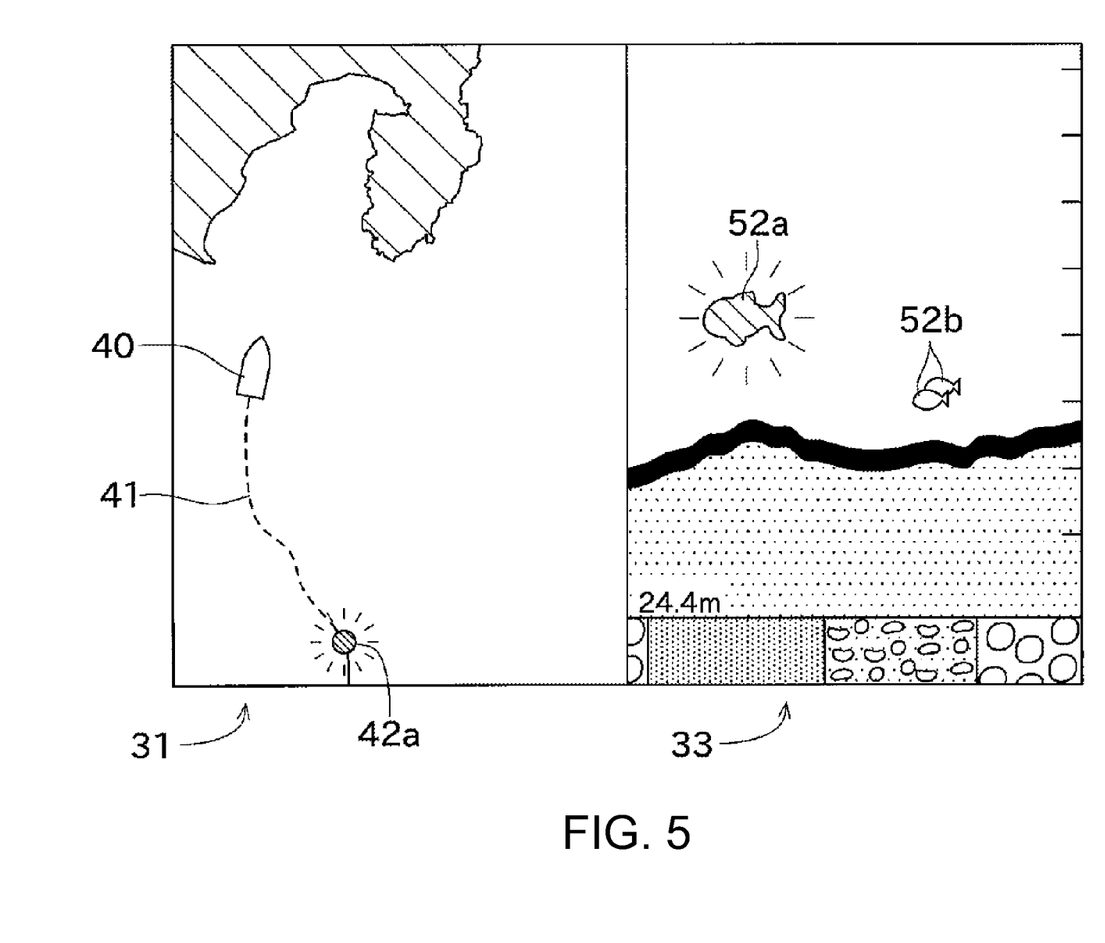
FIG. 5 is a view showing a screen image when the symbol is specified.
Figure 6:
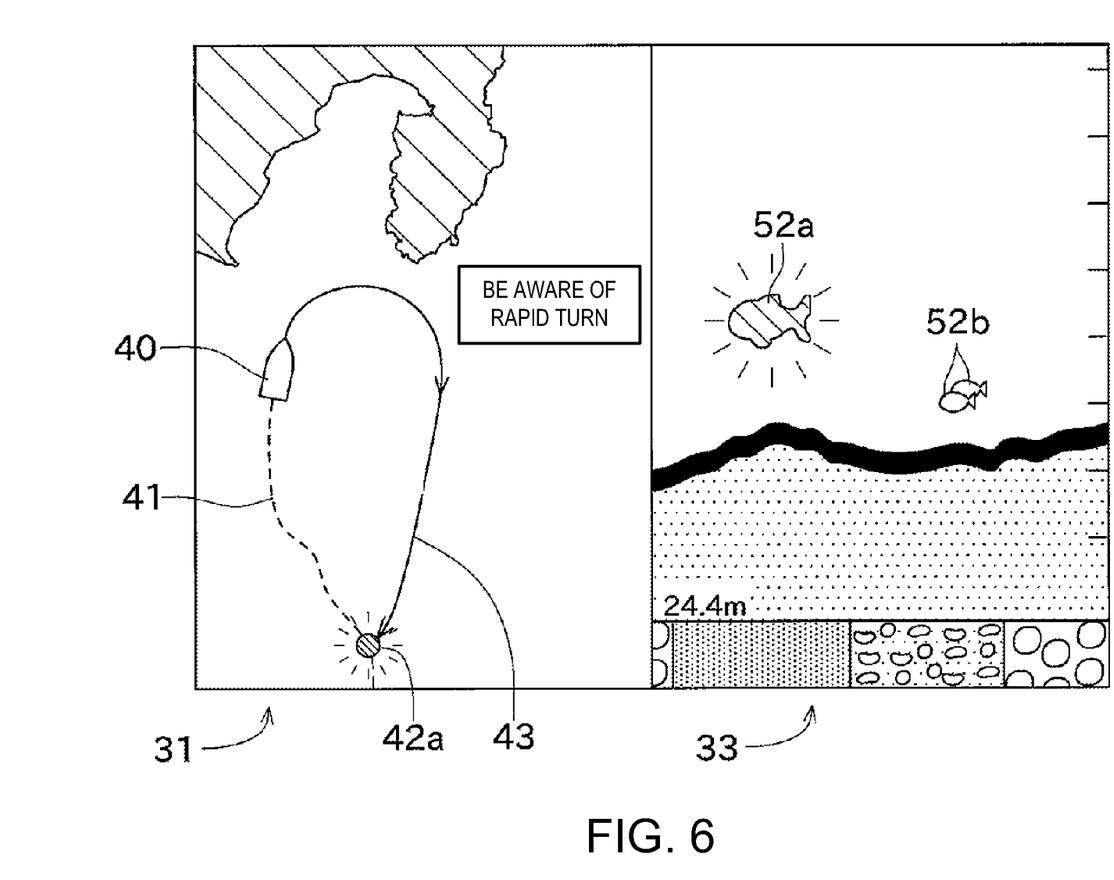
FIG. 6 is a view showing a screen image when a navigation route is displayed.

The controller 25 then highlights the specified symbol 52a as shown in FIG. 5, and displays a detection mark 42a indicative of the location associated with the symbol 52a in the first sensor image 31. Note that, in the first sensor image 31, a ship mark 40 indicating the current ship location, and a trace mark 41 indicating the traveling trace of the ship may be displayed in addition to the detection mark 42a.

Next, the controller 25 creates the navigation route with the location associated with the symbol 52a as a destination. The touch panel device 11 also has a function to cause the controller 25 to create a plurality of navigation routes, and guides the ship to the destination along a selected navigation route (route selecting function).

The controller 25 determines whether the route selecting function is ON or OFF (S103). When it is OFF, the controller 25 creates one navigation route with the location associated with the symbol 52a as the destination (e.g., a navigation route quickly reaching the destination without any stops), and displays the route in the first sensor image 31 (S104; a navigation route 43 in FIG. 6). Note that, if the navigation route 43 is accompanied with a rapid turn of the ship, the controller 25 may notify the operator, for example, with an indication of a message (see FIG. 6), illumination, and/or sound.

The controller 25 then outputs the created navigation route to the autopilot device 16 to cause the autopilot device 16 to execute the autopilot operation toward the destination (S105). As described above, the operator only performs a simple operation to direct the ship to the location specified through the third sensor image 33.

Note that the creation of the navigation route is not essential but only the destination location may be outputted to the autopilot device 16. In this case, the autopilot device 16 detects a difference between the direction of the destination from the ship and the ship's heading, and controls the rudder to correct the heading based on the difference.

Next, a case where the route selecting function is ON is described. Suppose that the symbol 52a is specified by the operator in this case as well. The controller 25 reads the location associated with the symbol (S102) and, after that, it creates a plurality of navigation routes considering the read location and other information (S106).

Figure 7:
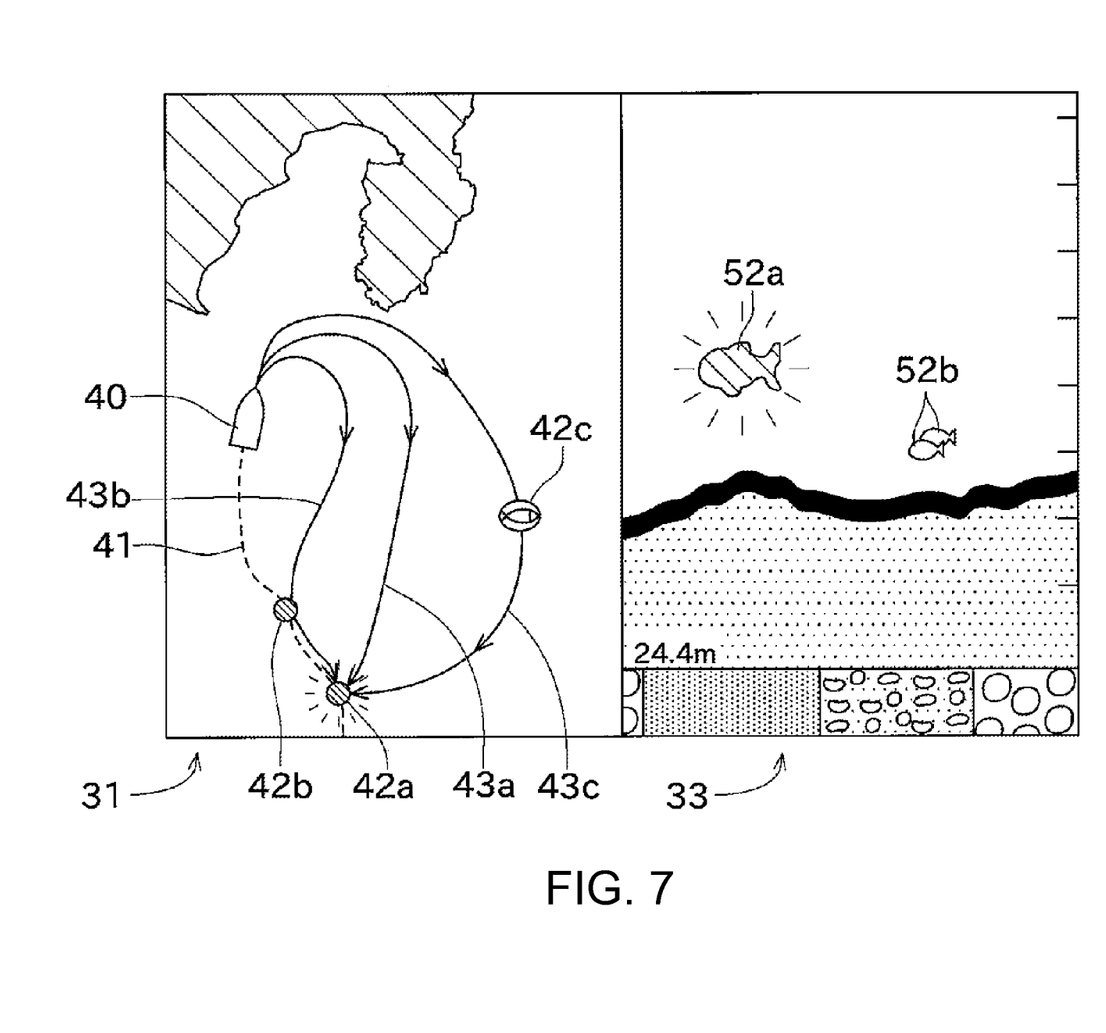
FIG. 7 is a view showing a screen image when a plurality of navigation routes are displayed.

Below, referring to FIG. 7, three examples will be given about the navigation routes created by the controller 25 in S106 (navigation routes 43a to 43c). The first navigation route 43a is, a shortcut route, created for the purpose of quickly reaching the destination, as same as the navigation route created when the route selecting function is OFF.

The second navigation route 43b is created based on the past fishfinder data. As shown in the third sensor image 33, the fishfinder 14 also detects another school of fish indicated by the symbol 52b, slightly after the symbol 52a specified by the operator. In consideration of this, the controller 25 creates the navigation route 43b so that the ship is directed to the location associated with the symbol 52a, after passing through the detected location of the symbol 52b. The controller 25 displays the location set as a waypoint (e.g., the detected location of the symbol 52b) in the first sensor image 31 (see a detection mark 42b in FIG. 7).

The third navigation route 43c is created based on the nautical chart information stored in the memory 25. Since the nautical chart information contains locations and depths of fish beds or fish banks, the controller 25 can obtain a location where fish is more likely to be present near the destination. Therefore, the controller 25 creates the navigation route 43c so that the ship is directed to the location associated with the symbol 52a, passing through the fish bed location(s). The controller 25 displays the location set as the waypoint (e.g., the fish bed) in the first sensor image 31 (see a fish bed mark 42c in FIG. 7).

The operator can select a navigation route from the navigation routes created as described above. When the controller 25 accepts the operator's selection (S107), it then outputs the accepted navigation route to the autopilot device 16 to cause the autopilot device 16 to execute an autopilot operation (S108). As described above, the ship can travel to the destination by a desired navigation route, without the operator per se creating the navigation route.

Summarizing this embodiment, the touch panel device 11 (fishfinder data display device) includes the memory 23, the display unit 21, and the controller 25. The memory 23 stores the fishfinder data acquired by the fishfinder 14 detecting underwater, and the acquired location of the fishfinder data so that the fishfinder data is associated with the location. The display unit 21 displays the image created based on the fishfinder data. When the operator's specifying operation is performed on the image displayed by the display unit 21, the controller 25 calculates the specified location, and causes the autopilot device 16 to execute the autopilot operation with the specified location as a destination.

Therefore, when the operator finds a location to reach with reference to the past fishfinder data, the operator only performs a touch operation to the display screen to direct the ship to the desired location.

In this embodiment, the operator's touch operation specifies the symbol or the like; however, if a display device having the function of this invention is connected with a mouse or a trackball, the symbol may be specified using a pointer displayed on a display screen.

When setting the waypoints based on the past fishfinder data, locations where the same kind of fish is detected as the specified symbol may be primarily set as the waypoints. The fishfinder data may be the latest past data or may be the fishfinder data which is acquired, for example, several days ago.

In this embodiment, the screen image is divided to simultaneously display the first sensor image 31 and the third sensor image 33; however, the screen image may be switched from the third sensor image 33 to the first sensor image 31 upon displaying the navigation route.

In this embodiment, the touch panel device 11 is a general-purpose display device which receives information from many sensors and displays the information; however, it may be applied to a fishfinder device comprised of the fishfinder 14 and a display unit capable of displaying the fishfinder data.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

What is claimed is:

1. A fishfinder data display device, comprising:
   a memory configured to store current fishfinder data obtained by a fishfinder performing underwater detecting and to store a location where the current fishfinder data is acquired so as to associate the current fishfinder data with the location;
   a display configured to display an image created based on the current fishfinder data; and
   a controller, when an operator performs a specifying operation to a predetermined part of the image displayed by the display, configured to read the location corresponding to the current fishfinder data based on the specified predetermined part of the image from the memory, automatically generate multiple navigation routes with the location as a destination based on past fishfinder data and the current fishfinder data, respectively, cause the display to display the navigation routes for selection by the operator, and upon selection of one of the navigation routes by the operator cause an autopilot device to execute an autopilot operation along the navigation route that was selected by the operator with the location as the destination.

2. The fishfinder data display device of claim 1, wherein the controller causes the autopilot device to execute the autopilot operation when a part in the image indicative of a school of fish is specified.

3. The fishfinder data display device of claim 1, wherein the display displays a nautical chart, and the controller causes the display to display the navigation routes along with the nautical chart.

4. The fishfinder data display device of claim 3, wherein the controller sets a waypoint of the navigation route based on the current fishfinder data stored in the memory.

5. The fishfinder data display device of claim 4, wherein the controller causes the display to display the waypoint.

6. The fishfinder data display device of claim 3, wherein the controller has access to nautical chart information and sets a waypoint of the navigation route based on the nautical chart information.

7. A fishfinder device, comprising:
   the fishfinder data display device of claim 1; and
   an oscillator configured to transmit a sound wave underwater and receiving a corresponding reflection wave to acquire the current fishfinder data.

8. A non-transitory computer readable media configured to store a computer executable program, which upon execution by a processor of a computer causes the computer to specify a destination, comprising:
   storing in a memory, current fishfinder data obtained by a fishfinder performing underwater detecting and a location where the current fishfinder data is acquired so as to associate the current fishfinder data with the location;

displaying on a display an image created based on the current fishfinder data;

reading, when an operator performs a specifying operation to a predetermined part of the image displayed by the display, the location corresponding to the current fishfinder data based on the specified predetermined part of the image from the memory;

automatically generating multiple navigation routes with the location as a destination based on past fishfinder data and the current fishfinder data, respectively;

displaying the navigation routes on the display for selection by the operator; and upon selection of one of the navigation routes by the operator causing an autopilot device to execute an autopilot operation along the navigation route that was selected by the operator with the location as the destination.

9. A method of specifying a destination, comprising:

storing current fishfinder data obtained by a fishfinder performing underwater detecting and a location where the current fishfinder data is acquired so as to associate the current fishfinder data with the location;

displaying on a display an image created based on the current fishfinder data;

reading, when an operator performs a specifying operation to a predetermined part of the image displayed by the display, the stored location corresponding to the current fishfinder data based on the specified predetermined part of the image;

automatically generating multiple navigation routes with the location as a destination based on past fishfinder data and the current fishfinder data, respectively;

displaying the navigation routes on the display for selection by the operator; and upon selection of one of the navigation routes by the operator causing an autopilot device to execute an autopilot operation along the navigation route that was selected by the operator with the location as the destination.

10. The method of claim 9, further comprising: causing the autopilot device to execute the autopilot operation when a part in the image indicative of a school of fish is specified.

11. The method of claim 9, further comprising: displaying a nautical chart, and causing the display to display the navigation routes along with the nautical chart.

12. The method of claim 11, further comprising: setting a waypoint of the navigation route based on the current fishfinder data stored in a memory.

13. The method of claim 12, further comprising: causing the display to display the waypoint.

14. The method of claim 11, further comprising: accessing nautical chart information and setting a waypoint of the navigation route based on the nautical chart information.

* * * * *